(12) United States Patent
O'Neil et al.

(10) Patent No.: US 8,509,786 B2
(45) Date of Patent: Aug. 13, 2013

(54) SYSTEMS AND METHODS FOR HANDLING CALLS IN A WIRELESS ENABLED PBX SYSTEM USING MOBILE SWITCHING PROTOCOLS

(75) Inventors: Douglas O'Neil, Atlanta, GA (US); Brian Ford, Lilburn, GA (US); Tammi L. Ford, legal representative, Lilburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 669 days.

(21) Appl. No.: 11/499,351

(22) Filed: Aug. 4, 2006
(Under 37 CFR 1.47)

(65) Prior Publication Data
US 2008/0032704 A1 Feb. 7, 2008

(51) Int. Cl.
*H04W 40/00* (2009.01)
(52) U.S. Cl.
USPC ............... 455/445; 455/414.1; 455/435.1
(58) Field of Classification Search
USPC .................... 455/414.1, 435.1, 445
See application file for complete search history.

(56) References Cited

U.S. PATENT DOCUMENTS

| | | | |
|---|---|---|---|
| 5,953,651 A * | 9/1999 | Lu et al. | 455/408 |
| 6,014,377 A * | 1/2000 | Gillespie | 370/351 |
| 6,622,016 B1 * | 9/2003 | Sladek et al. | 455/414.1 |
| 6,633,636 B1 | 10/2003 | McConnell et al. | |
| 6,687,243 B1 | 2/2004 | Sayers et al. | |
| 6,882,862 B1 | 4/2005 | Chia et al. | |
| 7,398,087 B1 * | 7/2008 | McConnell et al. | 455/435.1 |
| 7,466,991 B2 * | 12/2008 | Everson et al. | 455/552.1 |
| 2003/0095541 A1 * | 5/2003 | Chang et al. | 370/352 |
| 2004/0214586 A1 | 10/2004 | Loganathan et al. | |
| 2006/0025140 A1 * | 2/2006 | Bales et al. | 455/445 |

\* cited by examiner

*Primary Examiner* — Patrick Edouard
*Assistant Examiner* — Michael Irace

(57) ABSTRACT

Methods of routing an incoming call to a mobile telephone received at a wireless enabled private branch exchange (PBX) include issuing a location request query to an element of a wireless communications network to which the mobile telephone may be subscribed, receiving a location request response from the element indicative of a status of the mobile telephone on the wireless communications network, and forwarding the incoming call to a voicemail mailbox associated with the at least one mobile telephone if the location request response indicates that the mobile telephone is not available to receive a call on the wireless communications network. The incoming call is forwarded to a telephone number associated with the mobile telephone on the wireless communications network if the location request response indicates that the mobile telephone is available to receive a call on the wireless communications network. Corresponding communications systems and private branch exchanges are also provided.

17 Claims, 4 Drawing Sheets

SYSTEMS AND METHODS FOR HANDLING CALLS IN A WIRELESS ENABLED PBX SYSTEM USING MOBILE SWITCHING PROTOCOLS

FIELD OF THE INVENTION

The present invention relates to methods and systems for handling incoming calls. In particular, the present invention relates to methods and systems for handling incoming calls in a wireless enabled PBX system.

BACKGROUND

A private branch exchange (PBX) is a privately owned telephone switch that permits users to call one another on private telephone lines, and to share a certain number of outside lines for making telephone calls outside the PBX. Wireless enabled PBX systems provide significantly advanced mobility for users of the PBX system, since they permit PBX users to carry their telephones away from fixed locations, such as desks and/or offices. A wireless enabled PBX generally has the ability to communicate with mobile telephones through a number of microcell or picocell antennas located within or near a premises served by the PBX.

While some standards exist for private wireless telephone systems, the wireless communications protocols used in wireless enabled PBX systems need not be standardized, since wireless enabled PBX systems generally serve private entities, such as a business. In particular, wireless enabled PBX systems may use access methods that are the same as or different from those such as the FDMA (Frequency Division Multiple Access), TDMA (Time Division Multiple Access), TDD (Time Division Duplex), and CDMA (Code Division Multiple Access) access methods commonly used in standardized public wireless telephone networks. For example, a private wireless enabled PBX system may in some cases operate according to any of the above air interface standards, the DECT (Digital European Cordless Telephone) standard, or a non-standard interface. In some cases, a wireless enabled PBX may communicate with mobile telephones through a WiFi connection, such as an 802.11(b) or (g) wireless connection, which provides multiple access to the air interface using a carrier sense multiple access with collision avoidance (CSMA/CA) scheme.

An IP-PBX is a PBX that converges voice and data networks. Calls may be switched between VoIP (voice over Internet Protocol or IP) users on local lines while allowing all users to share a certain number of external phone lines. A typical IP-PBX can also switch calls between a VoIP user and a traditional telephone user, or between two traditional telephone users in the same way that a conventional PBX does. In an IP-PBX, Internet access, as well as VoIP communications and traditional telephone communications, may be provided to each user on a single line, which may provide flexibility, and may also reduce long-term operation and maintenance costs. Thus, a wireless enabled PBX may be implemented as a wireless IP-PBX which provides VoIP communications with wireless terminals using an 802.11(b) or (g) interface.

Despite the convenience and added mobility offered by a wireless enabled PBX system, such a system may be less desirable if a user's mobile telephone communicates only with the wireless enabled PBX system. In particular, it may be beneficial for a user to be able to take his or her mobile telephone along when leaving the area served by the wireless enabled PBX system, and use the mobile telephone on another network, such as a FDMA, TDMA, TDD, and/or CDMA based public wireless telephone network. The ability to use the same phone on both a private wireless enabled PBX system and a public wireless communications system may free a user from having to keep track of separate mobile telephones for use in the wireless enabled PBX system on the one hand and the public wireless telephone network on the other hand.

In order to permit a mobile telephone to be used with both a private wireless enabled PBX system and a public wireless telephone system, mobile telephones may be provided as dual mode devices capable of communicating over multiple frequency ranges using multiple air interface protocols. That is, in one mode (Public Mode), a mobile telephone may be configured to communicate in a public (licensed) frequency band over a cellular/PCS network using a standard wireless telephone communication air interface, such as IS-54, IS-95, GSM, etc. In another mode (Private Mode), a mobile telephone may be configured to communicate with a particular private wireless communication network, such as a wireless enabled PBX system, when it is in range of the private system. A wireless enabled PBX system may, but need not, use a WiFi interface similar to the WiFi interface designed for data network communications for communications with a mobile telephone.

When a mobile telephone is within range of the wireless enabled PBX system, for example, when the user of the mobile telephone is within a building/campus/area served by the wireless enabled PBX system, the mobile telephone may preferentially connect to the wireless enabled PBX system. Calls to/from the mobile telephone are managed by the wireless enabled PBX, which may in some cases be an IP-PBX.

In conventional systems, when the mobile telephone moves out of range of the wireless enabled PBX system while a call is in progress (for example if the user leaves the building/campus/area that is served by the wireless enabled PBX system), the wireless enabled PBX may be configured to handover the existing call to a public wireless network to which the user is a subscriber.

In order to execute the handover, conventional PBX systems are configured to set up a conference bridge between the existing call and the subscribers' mobile telephone number. Once the conference bridge has been set up, the connection between the wireless enabled PBX and the mobile telephone is dropped, and the call continues to be carried by the public wireless network carrier.

If the user receives a call at the PBX, the PBX may be configured to forward the call to the public wireless network if it is determined that the user is not active on the wireless enabled PBX system. Using conventional call processing techniques, if the user's mobile telephone is not active on the wireless carrier's communications system, or if the user fails to answer the call, the caller will be transferred to the voicemail system of the public wireless communications system. This may confuse the caller, since the caller initially called the user at the user's telephone number at the wireless enabled PBX, and would naturally expect that if the user is not available, the call would be answered by the PBX voicemail system or an attendant at the PBX location. Instead, the caller would be greeted with the voicemail greeting associated with the user's public wireless network carrier.

For example, if a caller called a user at the user's place of work, the caller would naturally expect that if the user is unavailable, the call would be transferred to the user's work voicemail system and/or would be given the option to speak with an attendant or some other person at the user's place of work. If instead the caller were transferred to a different voicemail system, such as the voicemail system of the user's public wireless telephone system, the caller may be presented with an unexpected voicemail greeting, and may be confused or frustrated at not being able to reach someone at their place of work.

SUMMARY

A communications system according to some embodiments of the invention includes a wireless enabled private branch exchange configured to route and manage telephone calls to terminals in the communications system including at least one mobile telephone, and an interface unit coupled to the wireless enabled private branch exchange and configured to issue a location request query to an element of a wireless communications network to which the at least one mobile telephone may be subscribed and to receive a location request response from the element indicative of a status of the at least one mobile telephone on the wireless communications network, and configured to provide the location request response to the private branch exchange. The private branch exchange may be further configured, upon receipt of the location request response, to forward a call directed to the at least one mobile telephone to a voicemail mailbox associated with the at least one mobile telephone if the location request response indicates that the at least one mobile telephone is not available to receive a call on the wireless communications network.

The communications system may further include at least one base station coupled to the wireless enabled private branch exchange and configured to establish a wireless communications link with the at least one mobile telephone when the at least one mobile telephone is within range of the at least one base station. The wireless communication link may employ a CSMA/CA wireless air interface, a TDMA air interface, a TDD air interface, a CDMA air interface and/or an FDMA air interface.

The interface unit may be further configured to send a provisioning request establishing a secondary call handling protocol for the at least one mobile telephone if the location request response indicates that the at least one mobile telephone is available to receive a call on the wireless communications network. The provisioning request may set a Call Forward-No Answer and/or a Call Forward-Busy setting in the wireless communications network for the at least one mobile telephone.

The interface unit may be configured to send the provisioning request to a home location register of the wireless communications system. In some embodiments, the interface unit may be configured to send the provisioning request to the mobile telephone and/or to a mobile switching center serving the mobile telephone.

The private branch exchange may be further configured to forward an incoming call received at the private branch exchange for the at least one mobile telephone to a telephone number associated with the at least one mobile telephone on the wireless communications network if the location request response indicates that the at least one mobile telephone is available to receive a call on the wireless communications network.

The private branch exchange may be further configured to alter at least one call setting associated with the mobile terminal when the incoming call may be forwarded to the mobile telephone in the wireless communications network. The at least one call setting may include a timeout value associated with the incoming call, and the private branch exchange may be further configured to increase the timeout value associated with the incoming call.

Methods of routing an incoming call to a mobile telephone received at a wireless enabled private branch exchange according to some embodiments of the invention include issuing a location request query to an element of a wireless communications network to which the mobile telephone is subscribed, receiving a location request response from the element indicative of a status of the mobile telephone on the wireless communications network, and forwarding the incoming call to a voicemail mailbox associated with the at least one mobile telephone if the location request response indicates that the mobile telephone is not available to receive a call on the wireless communications network.

The methods may further include establishing a wireless communications link with the mobile telephone when the mobile telephone is within range of a base station coupled to the wireless enabled private branch exchange. The wireless communication link may employ a CSMA/CA wireless air interface, a TDMA air interface, a TDD air interface, a CDMA air interface and/or an FDMA air interface.

The methods may further include sending a provisioning request establishing a secondary call handling protocol for the mobile telephone if the location request response indicates that the mobile telephone is available to receive a call on the wireless communications network. The provisioning request may set a Call Forward-No Answer and/or a Call Forward-Busy setting in the wireless communications network for the mobile telephone. Sending the provisioning request may include sending the provisioning request to a home location register of the wireless communications system, to the mobile telephone and/or to a mobile switching center serving the mobile telephone.

The methods may further include forwarding the incoming call to a telephone number associated with the mobile telephone on the wireless communications network if the location request response indicates that the mobile telephone is available to receive a call on the wireless communications network.

The methods may further include altering a call setting associated with the mobile terminal when the incoming call is forwarded to the mobile telephone in the wireless communications network.

The call setting may include a timeout value associated with the incoming call, and altering the call setting may include increasing the timeout value associated with the incoming call.

Some embodiments of the invention provide a wireless enabled private branch exchange configured to route and manage telephone calls to terminals in a private communications system including at least one mobile telephone, configured to issue a location request query to an element of a wireless communications network to which the at least one mobile telephone is subscribed and to receive a location request response from the element indicative of a status of the at least one mobile telephone on the wireless communications network. The PBX is further configured, upon receipt of the location request response, to forward a call directed to the at least one mobile telephone to a voicemail mailbox associated with the at least one mobile telephone if the location request response indicates that the at least one mobile telephone is not available to receive a call on the wireless communications network.

The wireless enabled private branch exchange may be further configured to forward an incoming call received at the private branch exchange for the at least one mobile telephone to a telephone number associated with the at least one mobile telephone on the wireless communications network if the location request response indicates that the at least one mobile telephone is available to receive a call on the wireless communications network.

The wireless enabled private branch exchange may be further configured to send a provisioning request establishing a secondary call handling protocol for the at least one mobile telephone to the element of the wireless communications network if the location request response indicates that the at least one mobile telephone is available to receive a call on the wireless communications network.

It will be understood that the present invention may also be embodied as computer program products. Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
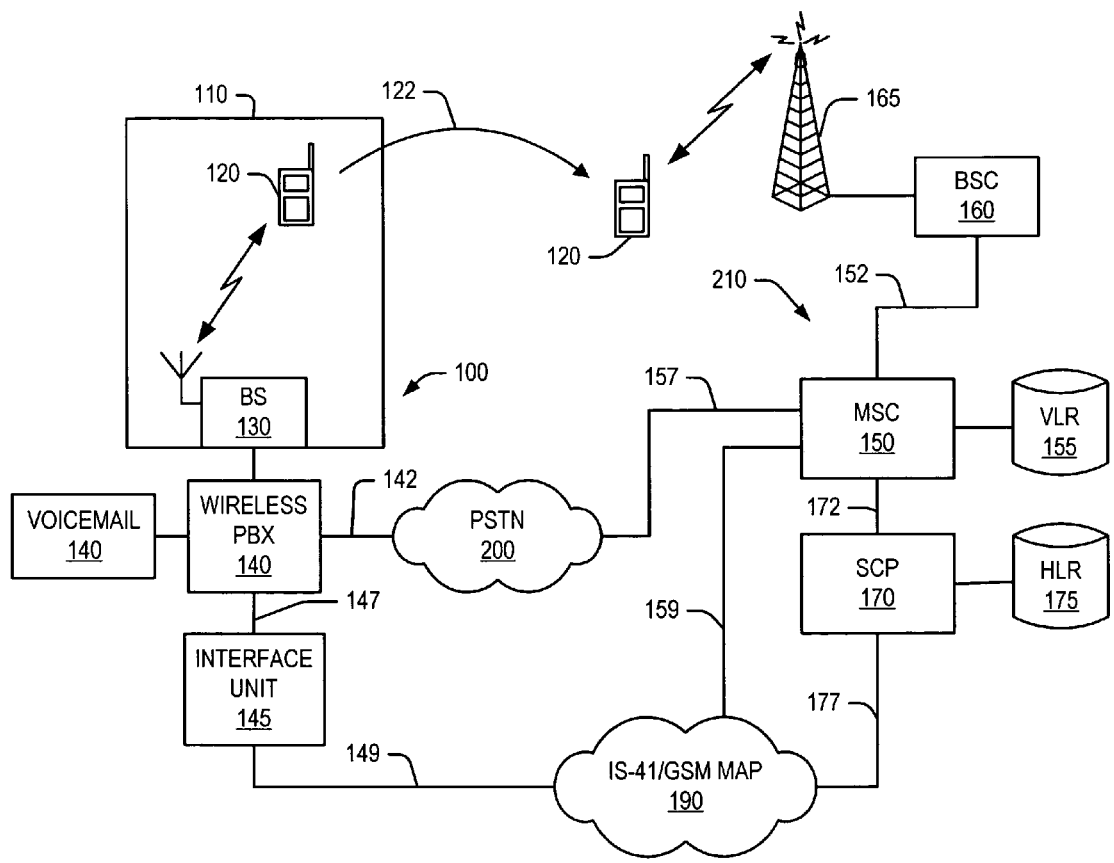
FIG. 1 is a schematic block diagram of a private communications system and a public wireless communications system according to some embodiments of the invention.

Some embodiments of the invention provide telecommunications systems and methods with improved call handling capabilities. In particular, some embodiments of the invention provide for the integration of privately operated wireless enabled PBX systems and public wireless communications systems that enables seamless operation of a mobile telephone in both systems. Callers to the mobile telephone may be presented with a more consistent call routing and call processing experience, while users of a mobile telephone may have improved ability to control the handling of calls to the mobile telephone.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Referring now to FIG. 1, some embodiments of the invention provide a private communications system 100 including a wireless enabled PBX 140 configured to provide telecommunications services to a customer premises 110, which may for example be a building or campus. The private communications system 100 may include a plurality of other wireless enabled and/or non-wireless enabled PBX devices (not shown) connected by public and/or private communications links. Each of the PBX devices in the private communications system 100 may serve a defined location, and may include a number of ports to which wired communications devices may be attached. In addition, the wireless enabled PBX 140 is configured to communicate with mobile telephones over a wireless interface, such as a wireless RF interface. The wireless enabled PBX 140 may be a conventional PBX device with a wireless adapter/wireless access point connected thereto. In some embodiments, the wireless enabled PBX 140 may be a PBX having built-in capability for wireless communications. Such wireless enabled PBX devices are available from a number of sources, including Avaya, Ericsson, and others.

The wireless enabled PBX 140 generally has the ability to communicate via a wireless interface with a mobile telephone 120 located within range of one of a plurality of base stations, such as base station 130, positioned at one or more locations within the customer premises 110. Each of the base stations 130 may define a picocell (i.e. a short range wireless communications service area) within which wireless communications with a mobile telephone 120 may be established and/or maintained.

The wireless enabled PBX 140 may be configured to communicate with mobile telephones over unlicensed portions of the RF spectrum, such as the 2.4 GHz RF band through a WiFi connection, such as an 802.11(b) or (g) wireless connection, which employs a carrier sense multiple access/collision avoidance (CSMA/CA) protocol. However, any wireless communications protocol, including TDMA, CDMA, FDMA and/or TDD may be employed to provide private communications services within the private communications system 100. For example, standardized protocols such as CT-2, Digital European Cordless Telephone (DECT) and/or nonstandardized protocols may be used to provide wireless communications between the wireless enabled PBX 140 and mobile telephones 120 within the customer premises 110.

In addition, the PBX may be configured to communicate using the TCP/IP protocol, and, accordingly, may provide internet connectivity to devices within the private communications system 100. Accordingly, the PBX 140 may be an IP-PBX.

The wireless enabled PBX 140 may be connected to a public switched telephone network (PSTN) 200, such as United States landline phone system which is built around a backbone of central office local exchange carriers (LECs) and interexchange carriers (IXCs). In particular, the PBX 140 may be connected directly to a central office switch, such as a Class 5 switch located at a central office in the PSTN 200. Calls to direct inward dial telephone numbers associated with the private communications system 100 are routed directly to a PBX in the communications system 100, such as the wireless enabled PBX 140, through a trunk 142, which may include a T-1 or other high speed data communications line.

An interface unit 145 connected to the wireless enabled PBX 140 enables the wireless enabled PBX 140 to communicate with elements of a public wireless communications network, such as wireless communications network 210. The interface unit 145 may be a standalone unit coupled to the wireless enabled PBX 140 unit by a communications link 147. Alternatively, the interface unit 145 may be integrated into the wireless enabled PBX 140, in which case the interface unit 145 may be implemented within the wireless enabled PBX 140 in hardware, software and/or a combination of hardware and software.

In particular, the interface unit 145 may be configured to communicate with elements of the public wireless communications network 210 using protocols defined in a wireless network communication standard such as IS-41 and/or GSM MAP (Mobile Application Part), which deal with call routing and setup in wireless telephone systems. Conceptually, the interface unit 145 is illustrated as communicating with the public wireless communications network 210 through an IS-41/GSM MAP cloud 190, although in particular embodiments, the interface unit 145 may communicate with the public wireless communications network 210 using the PSTN 200, the Internet, an X.25 packet switched data communications network, or by other means.

The public wireless communications network 210 may be a GSM (Global System for Mobile Communications) wireless telephone network such as the Cingular Wireless telephone network, but may also be an IS-95 CDMA network, an IS-54 TDMA/FDMA network, an advanced mobile phone service (AMPS) network, or other conventional wireless network. The public wireless communications network 210 includes at least one service control point (SCP) 170 which manages a home location register (HLR) 175 for the network 210. The HLR 175 is a database that contains information, such as registration information, call settings, subscribed features, location information, directory information, identification information, and/or other information concerning mobile terminals that are subscribed to the network 210. The HLR 175 is also used to authenticate mobile terminals and to support mobility management features to which the user of a mobile terminal has subscribed when that user is roaming.

The HLR 175 may be implemented as a single database and/or may be distributed over a number of databases. The network 210 further includes one or more mobile switching centers (MSCs), such as MSC 150, which manage call setup and routing for mobile terminals within a geographic area served by the MSC. The MSC 150 is connected to the service control point 170 through a high speed communications link 172. The HLR 175 may also be connected directly to the MSC 150 without using service control point. One or more base station controllers (BSC) 160 are connected to the MSC 150. Each BSC 160 manages at least one base station 165, which transmits/receives wireless communications signals to/from mobile terminals located within a geographic cell/sector served by the base station 165.

The MSC 150 is connected to the BSC 160 via a communications link 152 which includes signaling data links and trunk circuits 40 to provide switching between the MSC 150 and other MSCs and/or networks. The MSC 150 coordinates the establishment of calls to and from mobile stations located within a geographic area served by the MSC 150. In particular, the MSC 150 is responsible for transmission facilities management (i.e. controlling the operation of BSCs 160), mobility management (controlling the handover of calls from one BSC 160 to another), and call processing. The MSC is also connected with the PSTN 200 by trunk circuits 157 to route calls to and from the PSTN 200 and other networks connected to the PSTN 200.

Each MSC has an associated visitor location register (VLR) 155, which contains a database with temporary information about mobile terminals that access a base station 165 served by the MSC 150. Information about a mobile terminal may be obtained by the HLR of the mobile terminal's home network and/or from the mobile terminal itself. When a mobile telephone 120 identifies itself to an MSC 150, the MSC 150 sends a registration notice to the HLR 175 of the home network of the mobile telephone 120 via an IS-41/GSM MAP link 190 to authenticate the mobile telephone 120. The HLR of the mobile telephone 120 may be the HLR 175 of the network 210 to which the MSC 150 belongs, or it may be the HLR of a different network. In the present example, the mobile telephone is subscribed to the network 210, so the registration notice is sent from the MSC 150 to the HLR 175 of the wireless communications network 210. Once verified, the data for the mobile telephone 120 is transferred from the HLR 175 to the VLR 155 of the MSC 150. The VLR 155 maintains the record of the mobile telephone 120 while the mobile telephone 120 is active in a cell served by the MSC 150.

As illustrated in FIG. 1, a mobile telephone 120 that is located within the premises 110 of the private communications system 100 may establish/receive calls through the wireless enabled PBX 140 to/from telephones located within the private communications system 100 and/or outside the private communications system 100. A mobile telephone 120 may be configured according to some embodiments of the invention to operate in either the private communications system 100 or a second network, such as the public wireless communications network 210. For example, a mobile telephone 120 may be configured to have a dual mode capability, such that it may operate within the private wireless communications system 100 using a first communications protocol over a first frequency band, and may also operate within a second communications system using a second communications protocol using a second frequency band. Although this may entail providing two separate chipsets and amplifier chains within the mobile telephone 120, the cost and size of such components has been reduced to the point that it is not infeasible to provide such functionality within a transportable handset.

As indicated by arrow 122 in FIG. 1, the mobile telephone 120 may move from the area 110 served by the private communications system 100 to a location served by a public wireless communications network 210. When that occurs, the private communications system 100 may execute a handover to, transfer the call to the public communications network 210.

According to some embodiments of the invention, the wireless enabled PBX 140 is configured, upon receipt of an incoming call, to check to see if the called terminal (the destination terminal) is active on the private wireless communications system 100. If not, the interface unit 145 issues a location request to the HLR 175 of the public wireless communications system 210 to which the mobile telephone 120 is subscribed to determine if the mobile telephone 120 is registered on the public wireless communications system and/or if the mobile telephone 120 is registered on another wireless communications system (i.e. roaming). In an IS-41 network, the location request may conform to an IS-41 LOCREQ query. Other network communication protocols, such as GSM MAP, provide similar location requests.

In response to the query, the HLR 175 checks the status of the mobile telephone 120 and responds to the interface unit 145 just as it would to a similar inquiry from another MSC on the IS-41/GSM MAP system. In that case, the HLR 175 determines which VLR 155 the mobile telephone 120 was most recently registered in and issues a routing request to the VLR 155 to determine if the mobile telephone 120 is available. The routing request may be an IS-41 ROUTEREQ invocation and/or a corresponding GSM MAP statement. The VLR 155 determines which mobile switching center (MSC) 150 is currently serving the mobile telephone 120 and routes the routing request to the appropriate MSC 150, which then determines if the mobile telephone 120 is ready to receive a call. If so, the MSC 150 sends a response to the requesting entity, which in this example is the interface unit 145, indicating that the mobile telephone 120 is registered and available for a call, at which point the interface unit forwards the call to the public wireless communications system 210 using conventional PBX-to-MSC call setup procedures.

If the response from the MSC 150 indicates that the mobile telephone 120 is not available for a call because it is not currently active on the network, the interface unit 145 may attempt to contact another wireless network on which the mobile telephone 120 may be registered. If no other network is specified, the PBX 140 may send the incoming call to a voicemail mailbox 143 in the private communications system 100 and/or the PBX 140 associated with the mobile telephone 120.

In addition to transferring the call, the interface unit 145 may send a provisioning request to the HLR 175 to reconfigure the secondary call treatment information stored at the HLR 175 for the transferred call. For example, the provisioning request may instruct the HLR 175 to set the Call Forward-No Answer and Call Forward-Busy settings in the HLR 175 to cause the call to be forwarded to the PBX voicemail address of the user within the private communications system 100. Thus, if the call that is forwarded to the mobile telephone 120 fails to connect, the call may not be transferred to the voicemail system of the public wireless telephone network 210, but may be handled by the voicemail system of the private communications system 100.

When forwarding a call to the public communications system 210, the interface unit 145 may or may not provide an indication to the caller that the call is being transferred. In some embodiments, if the interface unit 145 is unable to reconfigure the secondary call handling treatment by the HLR 175 for some reason, the interface unit 145 and/or the wireless enabled PBX 140 may provide an indication that the call is being transferred away from the private communications system 100, since, in that case, if the call is not connected for some reason, the call may be handled by the voicemail system of the public communications system 210.

When a location request is made to the HLR 175 of the public communications system 210 by the interface unit 145, it may be desirable to temporarily modify the call settings of the private communications system 100, for example, to extend the timeout settings to permit the call to have extra rings before it is terminated. Otherwise, the end user may not have enough time to answer the call due to the extra time necessary to route the call to the public wireless communications system 210.

Some embodiments of the invention provide a user interface to permit the user to configure how the wireless enabled PBX 140 will handle secondary call treatment of calls forwarded to the public wireless communications system 210. For example, the user interface may permit customers to have the ability to automatically provision the HLR 175 of the public wireless communications system 210 to which the user is subscribed and/or to configure the PBX 140 with secondary call treatment protocols. For example, a user may change the configuration of the PBX 140 to play an announcement when forwarding a call. The user may also be able to increase the ring count for incoming calls, to add an audio prompt, and/or to add a beep, a text message/SMS or other message to indicate that the call is being forwarded. The user interface may be accessible via an internet connection and/or via the wireless telephone user interface.

Figure 2:
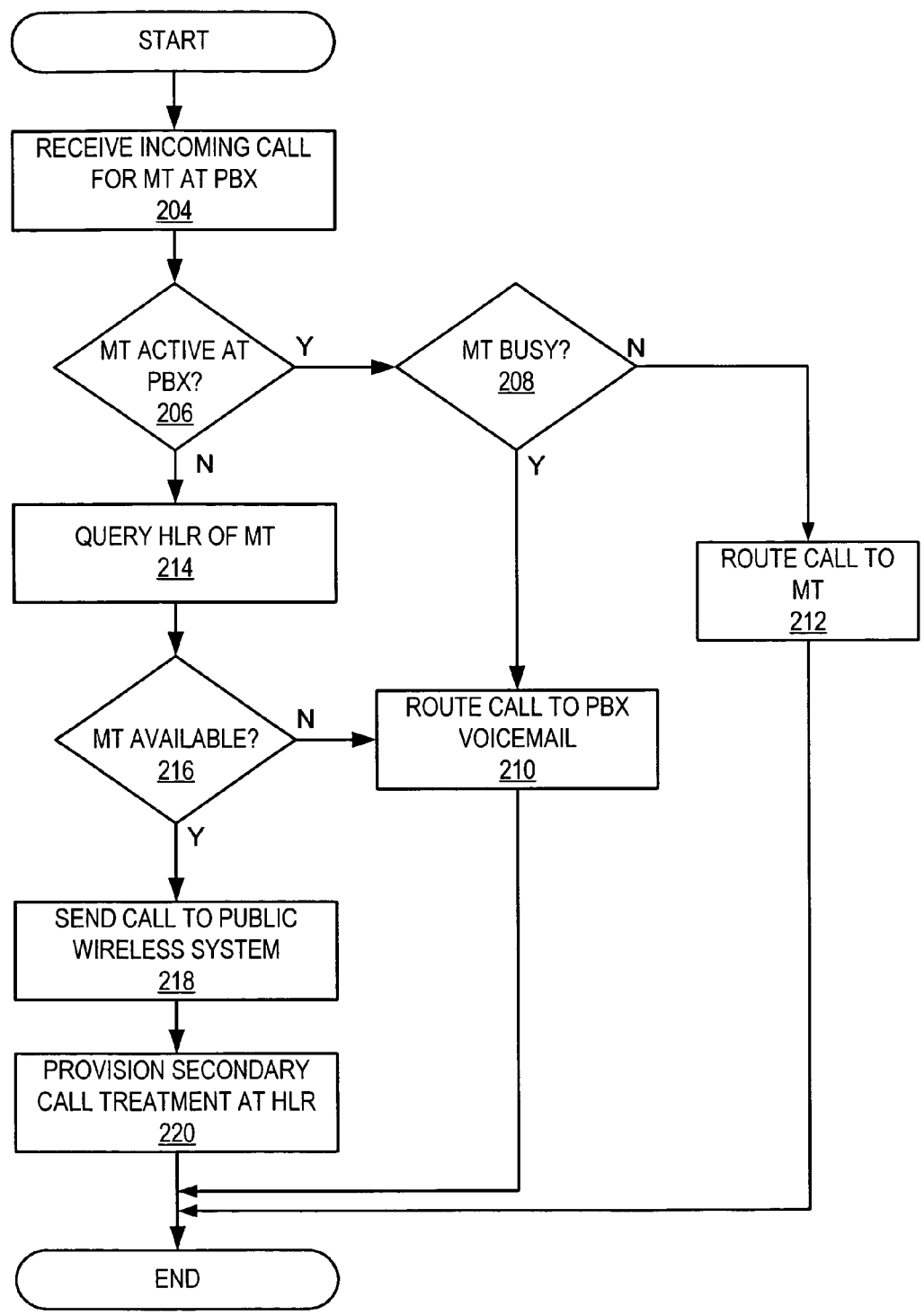
FIG. 2 is a flowchart illustrating operations according to some embodiments of the invention.

Operations according to some embodiments of the invention are illustrated in FIG. 2. As shown therein, the operations begin when an incoming call for a mobile telephone 120 (MT) is received at a PBX 140 of a private wireless communications system 100 (block 204). The PBX 140 determines if the mobile telephone 120 is active on the private communications system 100 (block 206). If the mobile telephone 120 is active on the system 100, then the PBX 140 determines if the mobile telephone 120 is busy (i.e. currently engaged in a call) (block 208). If not, the call is routed to the mobile telephone 120 (block 212). If the mobile telephone 120 is busy, then the call is handled according to call handling protocols defined in the PBX 140 for the mobile telephone 120, which generally involves forwarding the call to a voicemail mailbox 143 associated with the mobile telephone 120 (block 210).

If the PBX 140 determines that the user is not active on the private communications system 100, the interface unit 145 of the private communications system sends a query to the HLR 175 of the public wireless communications system 210 to which the mobile telephone 120 is registered (block 214). The query may be a LOCREQ query. In response to the query, the HLR 175 responds to the interface unit 145 with a response that indicates whether the mobile telephone 120 is currently active and available to receive a call. If the response from the HLR 175 indicates that the mobile terminal 120 is active but is currently busy or otherwise not available to receive a call, the PBX 140 handles the call according to call handling protocols defined in the PBX 140 for the mobile telephone 120, which generally involves forwarding the call to a voicemail mailbox 143 associated with the mobile telephone 120 (block 210). If the response from the HLR 175 indicates that the mobile telephone 120 is not active on the public wireless communications system 210, the PBX 140 may determine if there is another wireless communications system on which the mobile telephone may be registered, and if so, the PBX may send a query to the HLR of that system in an attempt to locate the mobile telephone 120. If there is no such other system, the PBX 140 handles the call according to call handling protocols defined in the PBX 140 for the mobile telephone 120.

If the response from the HLR 175 indicates that the mobile telephone 120 is active on the public wireless communications system 210 and is available for a call, the PBX 140 forwards the call to the telephone number associated with the mobile telephone 120 on the public wireless communications system 210 (block 218). In addition, the interface unit 145 may send a provisioning request to the HLR 175 of the public wireless communications system 210 to which the mobile telephone 120 is registered in order to define secondary call handling procedures for the mobile telephone 120 that may be followed at least with respect to the forwarded call (block 220). In that way, if the forwarded call is not connected for some reason, the secondary call handling procedures followed by the MSC 150 that is managing the setup of the forwarded call may send the call to the voicemail mailbox 143 of the mobile telephone 120 in the private wireless communications system 100.

Figure 3:
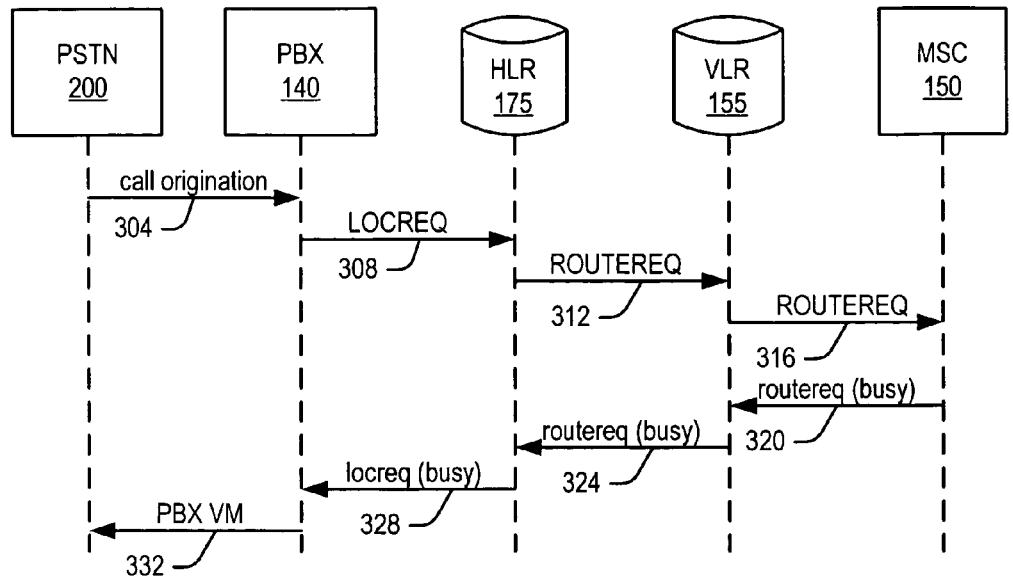
FIGS. 3-5 are schematic diagrams illustrating exemplary network message flows according to some embodiments of the invention.
Figure 4:
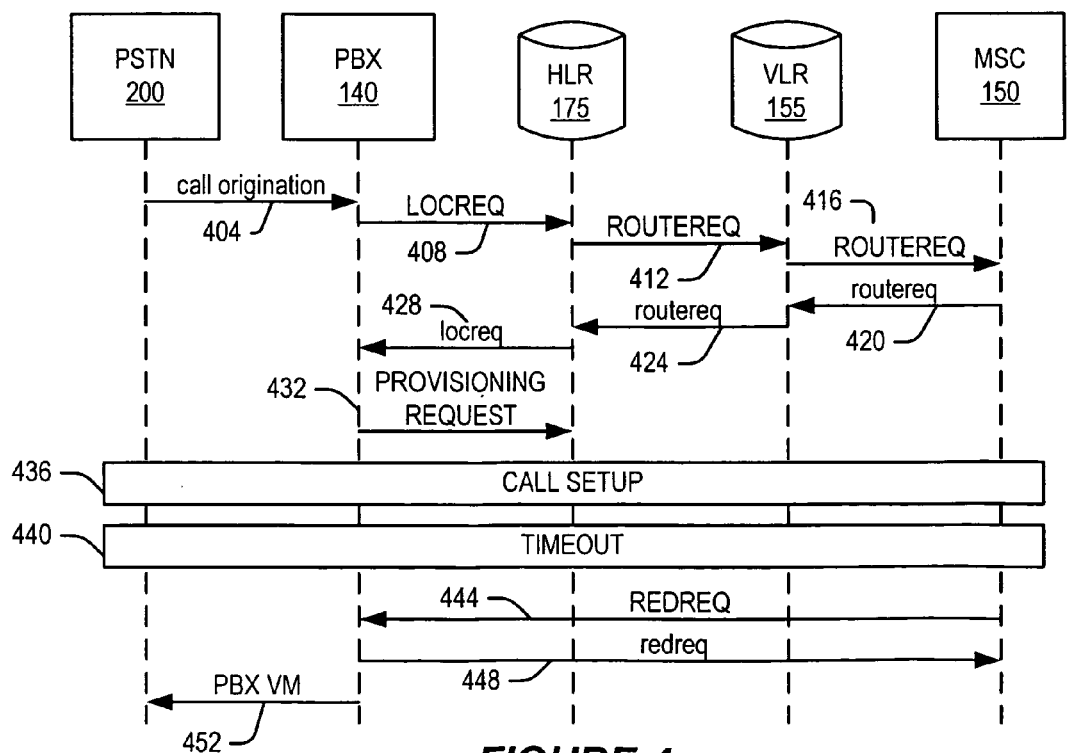
Figure 5:
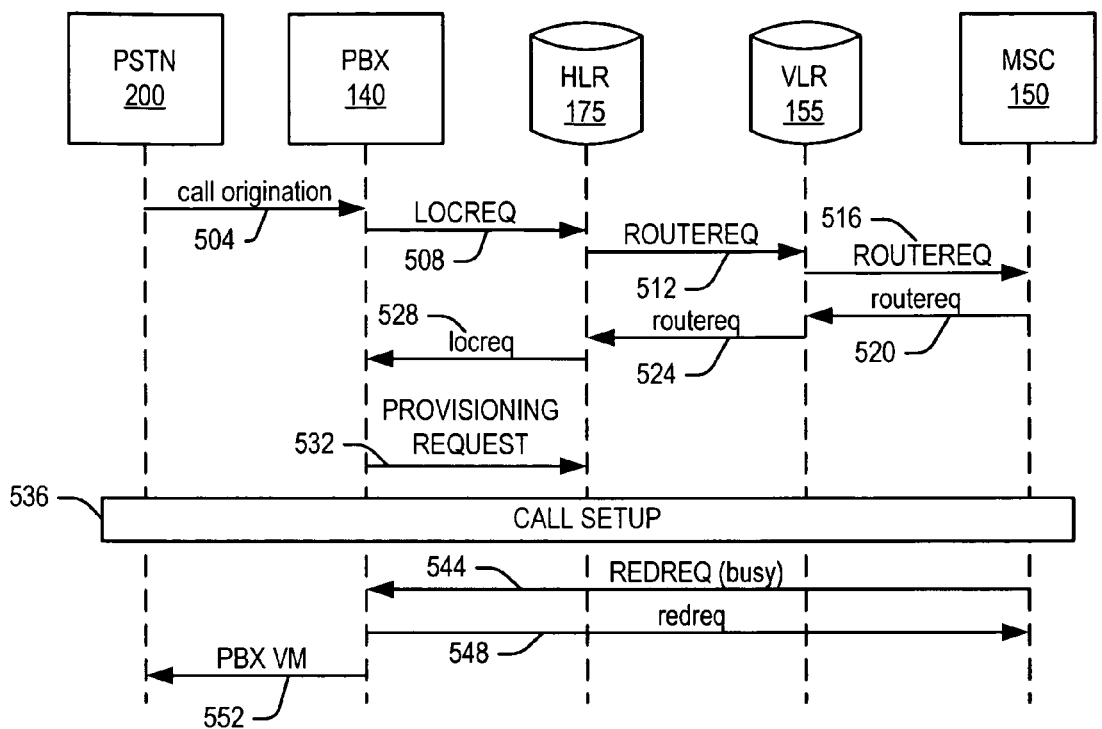

Exemplary message flows that may occur in an IS-41 network according to some embodiments of the invention are illustrated in FIGS. 3-5. The GSM MAP protocol defines similar message flows. FIG. 3 illustrates an exemplary message flow that may occur when a mobile terminal is available on a public wireless network, but is busy. As shown in FIG. 3, in the operations illustrated therein, a call to a mobile telephone 120 (referred to below as the destination terminal 120) is received by the PBX 140 through the PSTN 200 (message 304), although a similar message flow may occur if the call were to originate from within the private communications system 100. After the PBX 140 has determined that the destination terminal 120 is not currently active on the private communications system 100, the PBX 140 sends a location request (LOCREQ) query to the HLR 175 of a public wireless communications network 210 with which the destination terminal 120 is associated (message 308). The location request query, which identifies the destination terminal, may be sent directly from the PBX 140 and/or from an interface unit 145. In the examples illustrated in FIGS. 3-5, it is assumed that the functionality associated with the interface unit 145 described above is performed by the PBX 140.

When the LOCREQ query is received at the HLR 175, the HLR 175 checks its subscriber database and determines the identity of the VLR 155 in which the destination terminal 120 was last registered, based on the most recently received registration notice. The HLR 175 then sends a routing request (ROUTEREQ) to the VLR 155 in which the destination terminal 120 was last registered (message 312). The VLR 155 checks the status of the destination terminal 120 identified in the routing request, and forwards the routing request to the appropriate MSC 150 (message 316). If the MSC 150 determines that the destination terminal 120 is busy, it responds with a routing request response indicating that the destination terminal 120 is busy (message 320). This information is passed back to the HLR 175 and ultimately to the PBX 140 (message 324, 328). Upon notification that the destination terminal 120 is busy, the call is transferred to the PBX voicemail system (message 332). If the response to the location request query indicates that the mobile telephone 120 is not currently registered on the network, the PBX 140 may attempt to locate the mobile telephone 120 on another network and, if that is unsuccessful, transfer the call to the a voicemail mailbox 143 in the private communications system 100 associated with the mobile telephone 120.

Further operations according to embodiments of the invention are shown in FIG. 4. As shown therein, a call to a mobile telephone 120 (the destination terminal) is received by the PBX 140 through the PSTN 200 (message 404). After the PBX 140 has determined that the destination terminal 120 is not currently active on the private communications system, the PBX identifies the HLR 175 of a public wireless communications network associated with the destination terminal 120, and sends a location request (LOCREQ) query to the HLR 175 (message 408). The HLR 175 then sends a routing request (ROUTEREQ) to the VLR 155 in which the destination terminal 120 was last registered (message 412). The VLR 155 checks the status of the destination terminal 120 identified in the routing request, and forwards the routing request to the appropriate MSC 150 (message 416). If the MSC 150 determines that the destination terminal 120 is available, it responds with a routing request response indicating that the destination terminal 120 is available to receive a call (message 420). This information is passed back to the HLR 175 and ultimately to the PBX 140 (message 424, 428). Upon notification that the destination terminal 120 is available, the PBX 140 may send a provisioning request 432 to the HLR 175 designating secondary call handling protocols for the destination terminal. In some embodiments, the provisioning request 432 may be sent to the VLR 155 and/or to the MSC 150 that is currently serving the destination terminal. In further embodiments, the provisioning request may be sent as a message, such as a control channel message and/or a text message, to the destination terminal 120 instructing the destination terminal 120 to at least temporarily reconfigure secondary call handling protocols.

After sending the provisioning request, the PBX performs a call setup 436 to send the call to the destination terminal 120. In some embodiments, the call setup may be performed by dialing the destination terminal 120 through the PSTN and setting up a conference bridge between the incoming call and the call to the destination terminal 120. In other embodiments, the call may be setup through the PBX 140 and routed through the IS-41 connection to the MSC 150.

In some cases, even though the MSC 150 indicated that the destination terminal 120 was available for a call, the call setup 436 may fail. For example, as shown in FIG. 4, the call may not be connected within an allowed time limit, in which case a timeout 440 may occur. In that case, the MSC 150 may send a redirect request 444 (REDREQ) back to the PBX 140. The PBX 140 would respond to the redirect request (message 448) and send the call to the voicemail system of the PBX 140 (message 452). Alternatively, due to the provisioning request, the MSC 150 may forward the call to the voicemail mailbox 143 in the private communications system 100 identified for secondary call handling for the mobile telephone 120.

Further operations according to embodiments of the invention are shown in FIG. 5. As shown therein, a call to a mobile telephone 120 (the destination terminal) is received by the PBX 140 through the PSTN 200 (message 504). After the PBX 140 has determined that the destination terminal 120 is not currently active on the private communications system, the PBX identifies the HLR 175 of a public wireless communications network associated with the destination terminal 120, and sends a location request (LOCREQ) query to the HLR 175 (message 508). The HLR 175 then sends a routing request (ROUTEREQ) to the VLR 155 in which the destination terminal 120 was last registered (message 512). The VLR 155 checks the status of the destination terminal 120 identified in the routing request, and forwards the routing request to the appropriate MSC 150 (message 516). If the MSC 150 determines that the destination terminal 120 is available, it responds with a routing request response indicating that the destination terminal 120 is available to receive a call (message 520). This information is passed back to the HLR 175 and ultimately to the PBX 140 (message 524, 528). Upon notification that the destination terminal 120 is available, the PBX 140 may send a provisioning request 532 to the HLR 175 designating secondary call handling protocols for the destination terminal. In some embodiments, the provisioning request 432 may be sent to the VLR 155 and/or to the MSC 150 that is currently serving the destination terminal. In further embodiments, the provisioning request may be sent as a message, such as a control channel message and/or a text message, to the destination terminal 120 instructing the destination terminal 120 to at least temporarily reconfigure secondary call handling protocols.

After sending the provisioning request 532, the PBX performs a call setup 536 to send the call to the destination terminal. In some cases, even though the MSC 150 indicated that the destination terminal 120 was available for a call, the destination terminal 120 may be busy by the time the call setup 536 occurs. For example, the user of the destination terminal 120 may place a call before the call setup occurs. In that case, the MSC 150 may send a redirect request 544 (REDREQ) back to the PBX 140 indicating that the destination terminal 120 is busy. The PBX 140 would respond to the redirect request (message 548) and send the call to the voicemail system of the PBX 140 (message 552). Alternatively, due to the provisioning request, the MSC 150 may forward the call to the voicemail mailbox 143 in the private communications system 100 identified for secondary call handling for the mobile telephone 120.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A communications system, comprising: a wireless enabled private branch exchange for routing and managing telephone calls to terminals in the communications system including a mobile telephone; an interface unit coupled to the wireless enabled private branch exchange for issuing a location request query to an element of a public wireless communications network to which the mobile telephone is subscribed for receiving a location request response from the element indicative of a status of the mobile telephone on the public wireless communications network, and configured to provide the location request response to the private branch exchange wherein the private branch exchange, upon receipt of the location request response, to forwards a call directed to the mobile telephone to a voicemail mailbox in the private branch exchange associated with the mobile telephone if the location request response indicating that the mobile telephone is not available to receive a call on the public wireless communications network wherein the interface unit further sends a provisioning request establishing a secondary call handling protocol in the public wireless communications network for the mobile telephone before transferring the call directed to the mobile telephone to the public wireless communications network, the secondary call handling protocol defining a call handling protocol for handling calls to the mobile telephone in response one of a busy and a no answer condition of the mobile telephone, in response to the location request response indicating that the mobile telephone is available to receive the call on the public wireless communications network.

2. The communications system of claim 1, further comprising:
a base station coupled to the wireless enabled private branch exchange and configured to establish a wireless communications link with the mobile telephone when the mobile telephone is within range of the base station.

3. The communications system of claim 1 wherein the provisioning request sets one of a call forward-no answer and a call forward-busy setting in the wireless communications network for the mobile telephone.

4. The communications system of claim 1, wherein the interface unit is sends the provisioning request to one of the mobile telephone and a mobile switching center serving the mobile telephone.

5. The communications system of claim 1, wherein the private branch exchange forwards an incoming call received at the private branch exchange for the mobile telephone to a telephone number associated with the mobile telephone on the wireless communications network if the location request response indicates that the mobile telephone is available to receive a call on the wireless communications network.

6. The communications system of claim 5, wherein the interface unit sends the provisioning request establishing a secondary call handling protocol for the mobile telephone to an element of the wireless communications network.

7. The communications system of claim 5, wherein the private branch exchange alters a call setting in the private branch exchange associated with the mobile telephone when the incoming call is forwarded to the mobile telephone in the wireless communications network.

8. The communications system of claim 7, wherein the call setting comprises a timeout value associated with the incoming call, and wherein the private branch exchange increases the timeout value associated with the incoming call.

9. A method of routing an incoming call to a mobile telephone received at a wireless enabled private branch exchange, comprising: issuing a location request query to an element of a public wireless communications network to which the mobile telephone is subscribed;
receiving a location request response from the element indicative of a status of the mobile telephone on the public wireless communications network,
and forwarding the incoming call to a voicemail mailbox associated with the mobile telephone if the location request response indicates that the mobile telephone is not available to receive a call on the public wireless communications network;
and sending a provisioning request before a the incoming call is transferred to the public wireless communications network, establishing a secondary call handling protocol for the mobile telephone if the location request response indicates that the mobile telephone is available to receive the call on the public wireless communications network the secondary call handling protocol defining a call handling protocol for handling calls to the mobile telephone in response to one of busy and no answer condition of the mobile telephone.

10. The method of claim 9, further comprising:
establishing a wireless communications link with the mobile telephone when the mobile telephone is within range of a base station coupled to the wireless enabled private branch exchange.

11. The method of claim 9, wherein the provisioning request sets one of a call forward-no answer and a call forward-busy setting in the wireless communications network for the mobile telephone.

12. The method of claim 9, wherein sending the provisioning request comprises sending the provisioning request to one of the mobile telephone and a mobile switching center serving the mobile telephone.

13. The method of claim 9, further comprising:
forwarding the incoming call to a telephone number associated with the mobile telephone on the wireless communications network if the location request response indicates that the mobile telephone is available to receive a call on the wireless communications network.

14. The method of claim 13, further comprising:
sending the provisioning request establishing a secondary call handling protocol for the mobile telephone in the wireless communications network to an element of the wireless communications network.

15. The method of claim 13, further comprising:
altering a call setting in the private branch exchange associated with the mobile terminal when the incoming call is forwarded to the mobile telephone in the wireless communications network, wherein the call setting comprises a timeout value associated with the incoming call, and wherein altering the call setting comprises increasing the timeout value associated with the incoming call.

16. An apparatus comprising a wireless enabled private branch exchange telephone calls to terminals in a private communications system including mobile telephone for issuing a location request query to an element of a public wireless communications network to which the mobile telephone is subscribed and for receiving a location request response from the element indicative of a status of the mobile telephone on the public wireless communications network, and for forwarding, upon receipt of the location request response, to forward a call directed to the mobile telephone to a voicemail mailbox in the private branch exchange associated with the mobile telephone if the location request response indicating that the mobile telephone is not available to receive a call on the public wireless communications network
wherein the private branch exchange is sends a provisioning request establishing a secondary call handling protocol for the mobile telephone to the element of the public wireless communications network before transferring the call directed to the mobile telephone to the public wireless communications network the secondary call handling protocol defining a call handling protocol for handling calls to the mobile telephone in response to one of a busy and no answer condition of the mobile telephone in response to the location request response indicates that the mobile telephone is available to receive the call on the public wireless communications network.

17. The apparatus of claim 16, wherein the private branch exchange forwards an incoming call received at the private branch exchange for the mobile telephone to a telephone number associated with the mobile telephone on the wireless communications network if the location request response indicates that the mobile telephone is available to receive a call on the wireless communications network.

* * * * *

UNITED STATES PATENT AND TRADEMARK OFFICE
CERTIFICATE OF CORRECTION

PATENT NO. : 8,509,786 B2  
APPLICATION NO. : 11/499351  
DATED : August 13, 2013  
INVENTOR(S) : O'Neil et al.

Page 1 of 1

It is certified that error appears in the above-identified patent and that said Letters Patent is hereby corrected as shown below:

<u>In the Claims:</u>
Column 14, Claim 1, Line 50: Please correct "request response, to forwards a call"
to read -- request response, forwards a call --

Column 14, Claim 1, Line 63: Please correct "in response one of a busy"
to read -- in response to one of a busy --

Column 15, Claim 4, Line 12: Please correct "unit is sends"
to read -- unit sends --

Column 15, Claim 9, Line 48: Please correct "before a the incoming "
to read -- before the incoming --

Column 16, Claim 16, Line 42: Please correct "exchange is sends"
to read -- exchange sends --

Signed and Sealed this
Eighth Day of October, 2013

Teresa Stanek Rea
*Deputy Director of the United States Patent and Trademark Office*